(No Model.)  2 Sheets—Sheet 2.

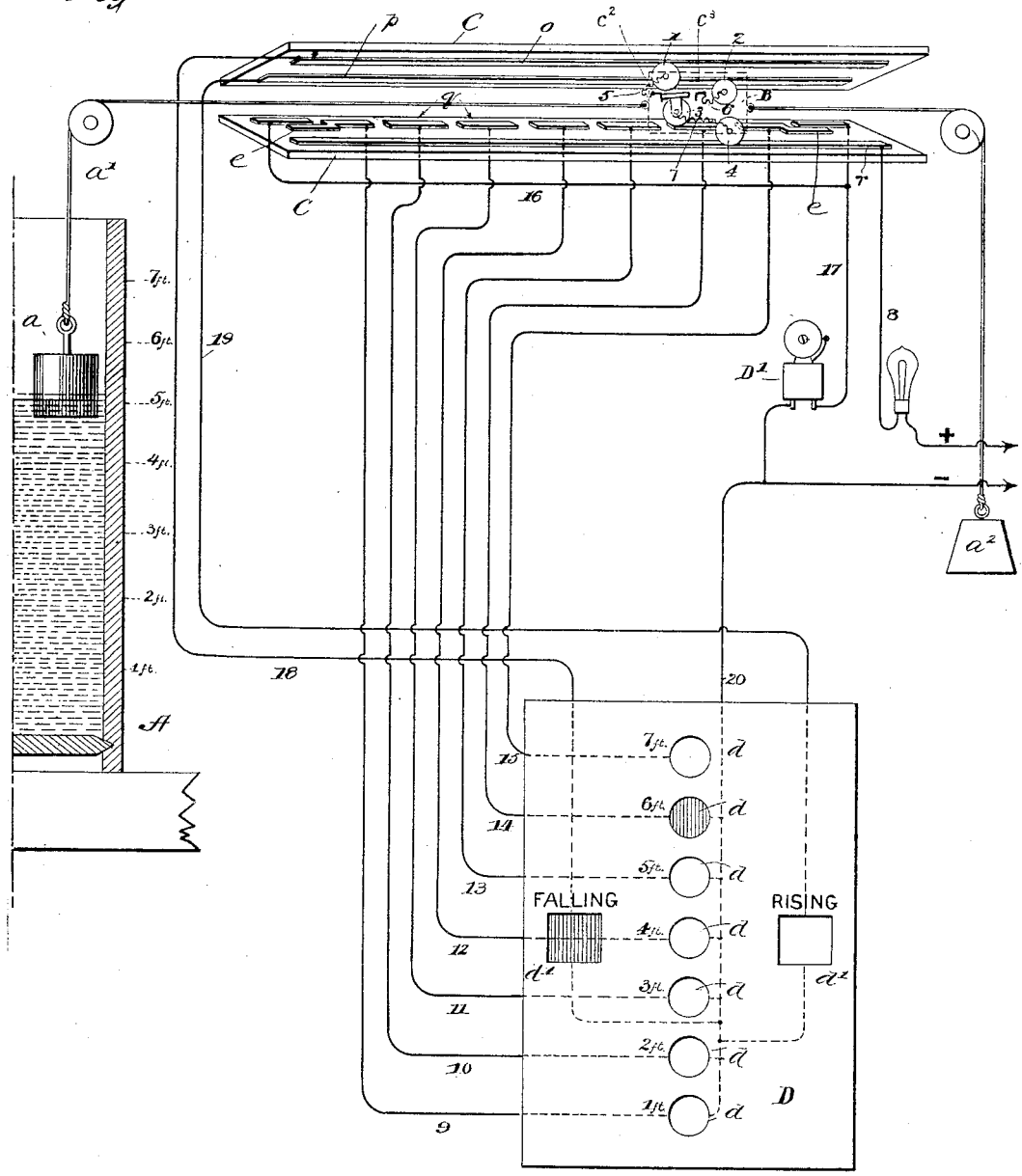

J. S. BULL.
ELECTRICAL ANNUNCIATOR.

No. 532,868.  Patented Jan. 22, 1895.

WITNESSES:  INVENTOR
Frank S. Ober  John S. Bull
C. N. Edwards.  BY
  ATTORNEY

UNITED STATES PATENT OFFICE.

JOHN S. BULL, OF NEW YORK, N. Y.

ELECTRICAL ANNUNCIATOR.

SPECIFICATION forming part of Letters Patent No. 532,868, dated January 22, 1895.

Application filed April 23, 1894. Serial No. 508,607. (No model.)

*To all whom it may concern:*

Be it known that I, JOHN S. BULL, a subject of the Queen of Great Britain, residing at New York, in the county of New York and State of New York, have invented certain new and useful Improvements in Electrical Annunciators, of which the following is a full, clear, and exact description.

My invention relates to electrical indicators or annunciators designed especially for water tanks for the purpose of indicating at a distance from the tank the following facts: first, the time when the tank becomes full or empty; second, the depth of the water in the tank at any time, and, third, whether the water is rising or falling in the tank. When the tank is full or empty audible notice is given by a bell, and a visual indicator informs as to whether the alarm was sounded because the tank was full or because it was empty.

My invention comprehends a float which rises and falls with the water in the tank, a traveling switch or trolley attached to the float by means of a cord and moving in unison therewith, an electro-magnetic indicator and alarm, a system of contacts over which the traveling switch moves, and a system of electrical conductors over which the current is caused to flow to the indicator and an alarm device for the purpose of giving the indications above mentioned.

Figure 3:
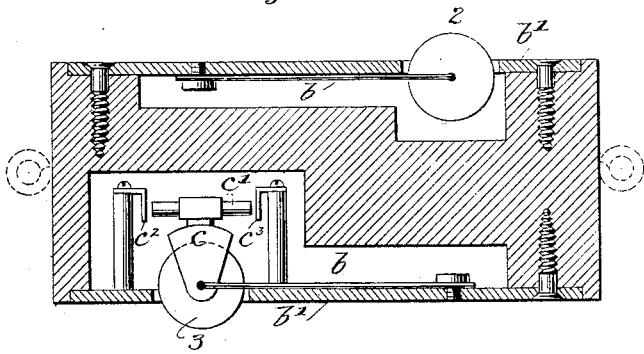
Figure 2:
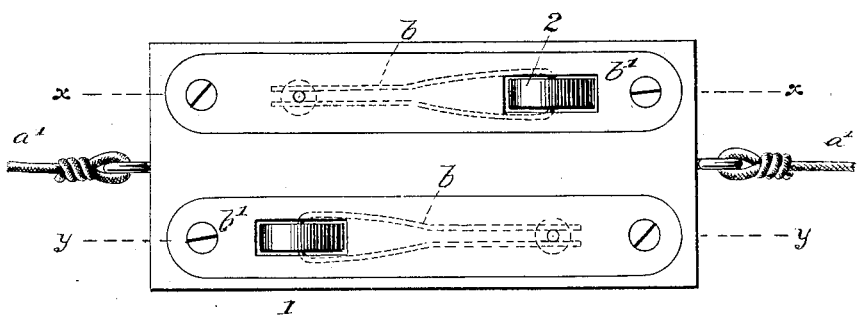
Figure 4:
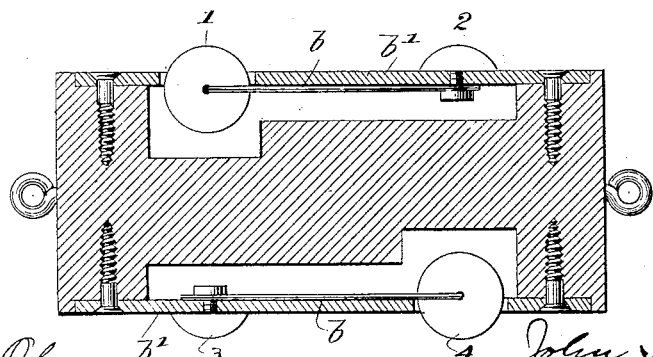

In the accompanying drawings: Figure 1 represents diagrammatically the entire apparatus constituting my invention. Fig. 2 is a plan of the trolley or traveling switch, and Figs. 3 and 4 are respectively sections of the trolley taken on lines $x$—$x$ and $y$—$y$ of Fig. 2.

A represents a water tank containing a float $a$. To the float is attached a cord $a'$ which runs over suitable guide pulleys and carries at its opposite end a counterpoise $a^2$. At a certain intermediate point in the cord $a$ traveling switch or trolley B is connected. This switch is provided with four wheels 1, 2, 3 and 4 respectively, which run upon four metallic tracks $o, p, q, r$, which are fixed upon a guide, trough or box C. These tracks are substantially equal in length to the distance through which the float may travel; that is to say, when the float is at its lowest point in the tank the trolley is at one end of the tracks, and when the float is at its highest point in the tank the trolley is at the opposite end of the track, its motion being in exact unison with the float. The wheels upon which the trolley rolls are electrical contacts and, as shown in the drawings, are arranged two on the under side of the trolley and two on the upper side thereof. It is only necessary, however, that the trolley shall carry four wheels and they may be located in any position so long as they can travel continuously in contact with their respective tracks. Wheel No. 1 travels in contact with track $o$; wheel 2 with track $p$; wheel 3 with track $q$; and wheel 4 with track $r$. Tracks $o, p$ and $r$ are continuous strips, while track $q$ is divided into a number of segments equal in number to the various positions of the water required to be indicated, plus two.

At any distant point from the tank where it is desired the indications shall be made, is located an indicator D and audible alarm D'. The indicator may be of any suitable character, but preferably will be in the usual form of a drop or disk indicator. Its face will contain a row of openings or windows $d$ equal in number and corresponding to the number of water levels to be indicated. Opposite each will be marked the water level to which it corresponds, such as "1 ft.," "2 ft.," "3 ft.," &c. There will also be on the face of the indicator two other holes or windows $d'$ and adjacent to one of these will be printed the word "Falling" and adjacent to the other the word "Rising." Behind each window will be placed an electro-magnet whose armature carries a red disk or plate which may be thrown across the opening and withdrawn therefrom when the magnet is energized and de-energized. This device will be of any of the usual annunciator constructions and as my invention is not in any sense concerned with it, a more complete description is not given. The alarm in this instance may be an ordinary electric bell.

As before stated, the trolley is provided with four wheels, 1, 2, 3 and 4 respectively. The axes of the rollers are mounted on springs $b$ which tend to force them outward. Each roller is in a chamber formed in the block and is free to move in and out slightly. The rollers with their attachments are mounted upon metallic plates $b'$ which are secured to the block by screws, as shown. The roller 3 carries a yoke $c$, to which is attached a carbon pencil $c'$ adapted to make connection at each end with a contact spring $c^2$ or $c^3$. Spring $c^2$ is connected by means of a wire 5 (see Fig. 1) with wheel 1 and spring $c^3$ is connected by a wire 6 with wheel 2. Wheel 3 is connected by wire 7 with wheel 4.

The electric circuits are as follows: One pole of the source of electricity is connected by means of wire 8 with track $r$. The segments of track $q$ are respectively connected with the magnets of the indicator behind the windows $d$ by the wires 9, 10, 11, 12, 13, 14 and 15. The end segments of track $q$ are connected together by wire 16 which leads by wire 17 to the alarm $D'$. Track $o$ is connected by wire 18 with the magnet behind the window of the indicator marked "Falling." Track $p$ is connected by wire 19 with the magnet behind the window of the indicator marked "Rising." The wires 9 to 15 and the wires 17, 18 and 19 after passing through their respective magnets lead to the common return wire 20, which is connected with the opposite pole of the source of electricity. The next to the last segment at each end of the track $q$ has an offset overlapping extension $e$ upon which wheel 3 of the trolley runs while traveling over the last segments.

The operation of the apparatus is as follows: As the float rises and falls with the water, the trolley moves in exact unison right and left. We will assume that the level of the water in the tank is between five and six feet and that the water is falling. In that case, wheel 3 of the trolley would be in contact with the segment of the track $q$ which connects with the indicator marked "6 ft." The following circuit would then be established: from wire 8 to track $r$, wheel 4, wire 7, wheel 3, track $q$, wire 14, indicator magnet controlling the window at the "6 ft." mark, and wire 20. The red disk would therefore show at the "6 ft." mark and indicate that the water in the tank was at that level. As the water is falling the trolley will be moving from the right to the left and the friction of track $q$ against the side of wheel 3 will cause the wheel, with its attached yoke, to swing, the bottom of the wheel moving backward and the yoke moving forward, thus bringing the contact pencil into connection with contact spring $c^2$. A branch circuit is thus established as follows: from wheel 3 to contact spring $c^2$, wire 6, wheel 2, track $o$, wire 18, "falling" magnet, and wire 20. The indicating red disk will therefore show at the "falling" window, thus giving the information that the water in the tank is falling. When the trolley has moved to the extreme end of its tracks, wheel 3 will run upon the end segment of its track, thus establishing a circuit through the wires 16 and 17 and cause the sounding of the alarm $D'$. At the same time wheel 3 will also run upon the extension $e$, which will establish a branch circuit either through wire 9 or wire 15 according to whether the trolley be at the left or right hand end of the tracks. Hence the red disk will show either at the indication of lowest water or at the indication of highest water and the observer will have audible notice that the supply of water to the tank is either to be increased or diminished, and visual notice as to which is required. The overlapping extensions $e$ provide for holding either of the circuits of the upper and lower indicating magnets continuously closed, while the alarm circuit is interrupted by the action of the bell. When the trolley is traveling from the left to the right, the yoke on wheel 3 is tilted in the opposite direction and contact is made with the spring $c^3$, thus closing the circuit through wire 5, wire 1, track $p$, wire 19, and the magnet controlling the window adjacent to which the word "rising" is marked.

It is to be understood that the trolley may be provided with sliding or rubbing contacts in place of the wheel, and in some instances a rubbing contact may serve better in place of wheel 3.

It is also to be understood that the guide through which the trolley moves may be of any suitable form and the tracks may be laid in any relation to each other so long as they are parallel. The particular form of the trolley itself is not material. The movement of the trolley at the same speed as the float is not essential for it is clear that any arrangement of variable pulleys or gears may be used, whereby the movement of the trolley may be much greater or less than that of the float.

My invention is applicable to oil tanks or tanks containing any liquid as well as the water tanks herein referred to.

Having thus described my invention, I claim—

1. In an electrical indicating apparatus, the combination of a trolley, a series of contacts with which the trolley makes a traveling connection, a series of indicators respectively electrically connected with said contacts, an electric switch carried by the trolley, circuits controlled by said switch and indicators in said circuits, the switch being automatically thrown when the direction of movement of the vehicle is changed.

2. In an electrical indicating apparatus, the combination of a float rising and falling with a body of liquid, a trolley moving in proportion therewith, an indicator showing the position of the trolley at any time, and a device carried by the trolley and acting through electric circuits upon the indicator to show the direction in which the trolley is moving, substantially as set forth.

In testimony whereof I subscribe my signature in presence of two witnesses.

JOHN S. BULL.

Witnesses:
FRANK S. OBER,
C. V. EDWARDS.